United States Patent
Araki

(10) Patent No.: US 9,567,494 B2
(45) Date of Patent: Feb. 14, 2017

(54) DOUBLE-SIDED ADHESIVE TAPE

(71) Applicant: DEXERIALS CORPORATION, Tokyo (JP)

(72) Inventor: Noboru Araki, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 60 days.

(21) Appl. No.: 14/099,370

(22) Filed: Dec. 6, 2013

(65) Prior Publication Data

US 2014/0093685 A1 Apr. 3, 2014

Related U.S. Application Data

(63) Continuation of application No. 13/977,839, filed as application No. PCT/JP2012/054348 on Feb. 23, 2012, now Pat. No. 8,999,455.

(30) Foreign Application Priority Data

Mar. 9, 2011 (JP) .................. 2011-051708

(51) Int. Cl.
C09J 7/00 (2006.01)
C09J 4/00 (2006.01)
(Continued)

(52) U.S. Cl.
CPC ............. C09J 7/00 (2013.01); C08F 220/18 (2013.01); C09J 4/00 (2013.01); C08F 220/06 (2013.01);
(Continued)

(58) Field of Classification Search
CPC ............. Y10T 428/24355; C09J 7/00
See application file for complete search history.

(56) References Cited

U.S. PATENT DOCUMENTS 6,861,141 B2 3/2005 Buccellato et al.
6,908,671 B2 6/2005 Hosokawa et al.
(Continued)

FOREIGN PATENT DOCUMENTS

CN 101473006 A 7/2009
EP 1 574 556 A2 9/2005
(Continued)

OTHER PUBLICATIONS

International Search Report issued in International Application No. PCT/JP2012/054348 dated May 22, 2012.
(Continued)

*Primary Examiner* — William P Watkins, III
(74) *Attorney, Agent, or Firm* — Oliff PLC

(57) ABSTRACT

Disclosed is a double-sided adhesive tape that has a difference in adhesion between the front and rear sides thereof and can be produced to have a reduced thickness by a simple method. The double-sided adhesive tape is a sheet-shaped cured product of an adhesive composition containing a resin composition and an inorganic filler. The resin composition contains (A) an acrylate-based monomer, (B) a monomer copolymerizable with (A), (C) a photopolymerization initiator, and (D) a photo-crosslinking agent. The inorganic filler has an average particle diameter of 30 μm or less and is localized on one side of the tape. The surface roughness (center line average roughness Ra) of the tape surface on the side on which the inorganic filler is localized is 0.01 to 0.50 μm.

12 Claims, 3 Drawing Sheets

(51) Int. Cl.

| | |
|---|---|
| *C08K 3/00* | (2006.01) |
| *C08K 5/00* | (2006.01) |
| *C08F 220/06* | (2006.01) |
| *C08F 222/10* | (2006.01) |
| *C08F 220/18* | (2006.01) |

(52) U.S. Cl.
CPC .. *C08F 222/1006* (2013.01); *C08F 2220/1833* (2013.01); *C08K 3/0033* (2013.01); *C08K 5/0025* (2013.01); *C08K 2201/003* (2013.01); *C09J 2201/134* (2013.01); *C09J 2201/622* (2013.01); *C09J 2433/00* (2013.01); *Y10T 428/24372* (2015.01)

(56) References Cited

U.S. PATENT DOCUMENTS

| | | | |
|---|---|---|---|
| 7,744,976 B2* | 6/2010 | Katoh et al. | 428/40.1 |
| 2008/0227909 A1 | 9/2008 | Yoda et al. | |
| 2009/0169852 A1* | 7/2009 | Choi | C09J 7/00 428/220 |
| 2009/0186164 A1 | 7/2009 | Hirao et al. | |

FOREIGN PATENT DOCUMENTS

| | | |
|---|---|---|
| JP | A-07-145358 | 6/1995 |
| JP | A-2006-137833 | 6/2006 |
| JP | A-2007-107011 | 4/2007 |
| JP | A-2007-123624 | 5/2007 |
| JP | A-2009-132803 | 6/2009 |
| JP | A-2009-173695 | 8/2009 |
| WO | WO 2008/005782 A2 | 1/2008 |
| WO | WO 2008/044418 A1 | 4/2008 |

OTHER PUBLICATIONS

English-language translation of International Preliminary Report on Patentability issued in International Application No. PCT/JP2012/054348 dated Sep. 10, 2013.
Extended European Search Report dated Jul. 17, 2014 issued in European Application No. 12754530.9.
Jun. 30, 2014 Office Action issued in Chinese Application No. 201280012296.8 (with English Translation).
Oct. 14, 2014 Office Action issued in Japanese Patent Application No. 2011-051708 (with English translation).
Mar. 25, 2015 Office Action issued in Chinese Patent Application No. 201280012296.8.
Jun. 16, 2015 Office Action issued in Japanese Application No. 2011-051708.
Nov. 9, 2015 Office Action issued in Chinese Application No. 201280012296.8.
Nov. 17, 2015 Office Action issued in Taiwanese Application No. 101106491.
Jul. 20, 2016 Office Action issued in European Application No. 12 754 530.9.

* cited by examiner

DOUBLE-SIDED ADHESIVE TAPE

This application is a Continuation of U.S. patent application Ser. No. 13/977,839 filed on Jul. 1, 2013, which in turn is a National Phase of International Application No. PCT/JP2012/054348 filed on Feb. 23, 2012, which claims priority to Japanese Patent Application No. 2011-051708 filed on Mar. 9, 2011. The disclosures of the prior applications are hereby incorporated by reference herein in their entireties.

TECHNICAL FIELD

The present invention relates to a double-sided adhesive tape having a difference in adhesion between the front and rear sides thereof.

BACKGROUND ART

There is a double-sided adhesive tape formed to have a difference in adhesion between the front and rear sides thereof, in view of handleability and removability of an adherend.

In one known conventional method of producing a double-sided adhesive tape having a difference in adhesion between the front and rear sides thereof, the front and rear sides of a sheet formed of a UV curable adhesive composition are irradiated with UV rays at different irradiation intensities (Patent Literature 1). In another known method, at least two adhesive layers different in adhesion force are stacked (Patent Literature 2).

CITATION LIST

Patent Literature

Patent Literature 1: Japanese Patent Application Laid-Open No. 2007-123624
Patent Literature 2: Japanese Patent Application Laid-Open No. 2007-107011

SUMMARY OF INVENTION

Technical Problem

However, the conventional methods of producing a double-sided adhesive tape having a difference in adhesion between the front and rear sides thereof include complicated steps, and therefore the production cost is high. In addition, the method in which different UV ray intensities are used for the front and rear sides (Patent Literature 1) and the method in which adhesive layers different in adhesion force are stacked (Patent Literature 2) are approaching their limits in achieving the desired adhesion force while the tape is reduced in thickness.

In view of the above circumstances, it is an object of the present invention to allow a thinner double-sided adhesive tape having a difference in adhesion between the front and rear sides thereof to be produced by a simple method.

Solution to Problem

The present inventor has found that, when an adhesive composition containing an inorganic filler having a specific particle diameter is formed into a sheet shape on a release sheet having a specific surface roughness, a double-sided adhesive tape having a large difference in adhesion between the front and rear sides thereof can be obtained because of a combination of the roughness of the surface of the adhesive tape to which the surface roughness of the release sheet is transferred and uneven sedimentation of the inorganic filler toward the tape surface having the above surface roughness.

Accordingly, the present invention provides a double-sided adhesive tape including an adhesive composition containing an inorganic filler and a resin composition containing the following components (A) to (D)
  (A) an acrylate-based monomer,
  (B) a monomer copolymerizable with (A),
  (C) a photopolymerization initiator, and
  (D) a photo-crosslinking agent,
the adhesive composition being cured into a sheet form, wherein the inorganic filler has an average particle diameter of 30 μm or less and is localized on one side of the tape, and a surface roughness (center line average roughness Ra) of a tape surface on the one side on which the inorganic filler is localized is 0.01 to 0.50 μm.

The present invention also provides a method of producing the above-described double-sided adhesive tape, the method including: applying an adhesive composition containing an inorganic filler having an average particle diameter of 30 μm or less and a resin composition containing the following components (A) to (D)
  (A) an acrylate-based monomer,
  (B) a monomer copolymerizable with (A),
  (C) a photopolymerization initiator, and
  (D) a photo-crosslinking agent
to a release sheet having a surface roughness (center line average roughness Ra) of 0.01 to 0.50 μm; and photo-curing the adhesive composition.

Advantageous Effects of Invention

The double-sided adhesive tape of the present invention is obtained by forming the adhesive composition containing the inorganic filler into a sheet form on the release sheet having a specific surface roughness and therefore can be produced in a simple manner.

The double-sided adhesive tape of the present invention can be configured as a single adhesive layer formed by curing the adhesive composition, and therefore other adhesive layers and a layer serving as a substrate are not necessary. Therefore, the desired adhesion force is ensured while the tape is reduced in thickness.

DESCRIPTION OF EMBODIMENTS

The present invention will next be specifically described by way of embodiments.

Figure 1:
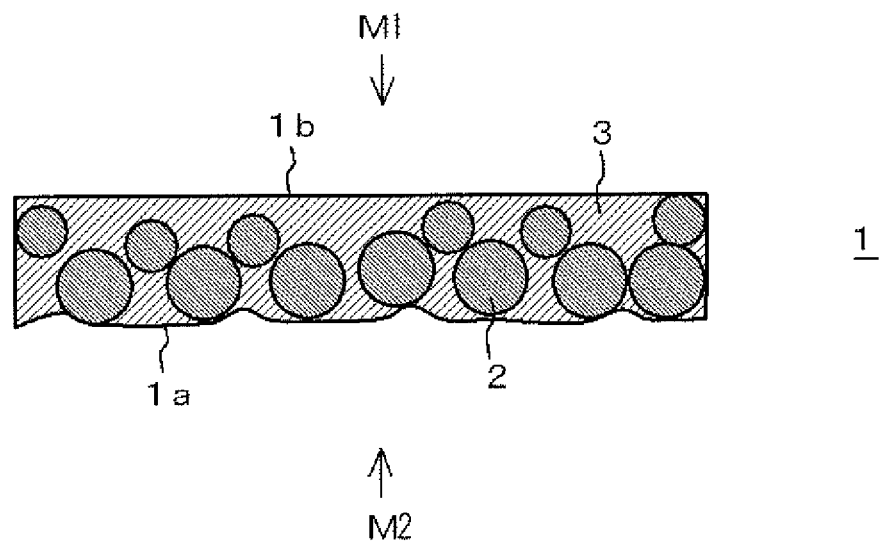
FIG. 1 is a schematic cross-sectional view of a double-sided adhesive tape of the present invention.

FIG. 1 is a schematic cross-sectional view of a double-sided adhesive tape 1 in an embodiment of the present invention. The double-sided adhesive tape 1 is formed from a sheet-shaped adhesive layer 3 formed by curing an adhesive composition containing a photocurable resin composition and an inorganic filler 2 by irradiation with light. The average particle diameter of the inorganic filler 2 is 30 μm or less. The inorganic filler 2 is localized on the side closer to one surface 1a of the tape, and the surface roughness of the one surface 1a on the side on which the inorganic filler 2 is localized is 0.01 to 0.50 μm in terms of the center line average roughness Ra. No inorganic filler 2 is present on the other surface 1b of the tape, and the adhesive layer 3 is formed flat. Therefore, in the double-sided adhesive tape 1, the adhesion of the one surface 1a is significantly reduced because of a combination of the presence of the inorganic filler 2 having an average particle diameter of 30 μm or less and the irregularities on the surface of the adhesive layer 3 having a surface roughness Ra of 0.01 to 0.50 μm. However, since no inorganic filler 2 is present on the other surface 1b and the adhesive layer 3 is formed flat thereon, no reduction in adhesion due to the inorganic filler and surface irregularities occurs. Therefore, in the double-sided adhesive tape 1, the adhesion on the front side is significantly different from the adhesion on the rear side, and the ratio of the peel strength of an adherend M1 sticking to the front surface (flat surface (the other surface 1b)) to the peel strength of an adherend M2 sticking to the rear surface (rough surface (the one surface 1a)) can be 2 or larger.

Figure 2:
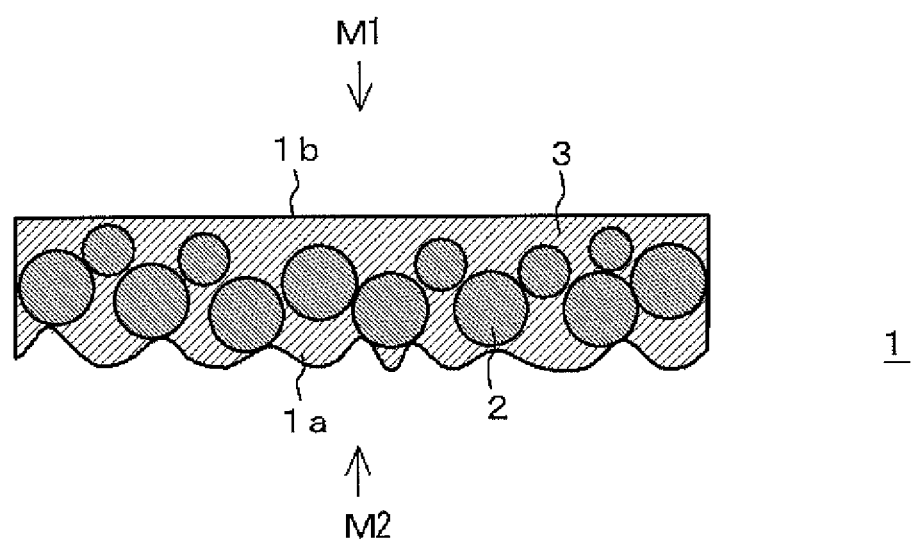
FIG. 2 is a schematic cross-sectional view of a double-sided adhesive tape having an excessively large surface roughness.

If the surface roughness of the one surface 1a of the tape falls below or above the above-described range, the adhesion of the one surface 1a cannot be reduced sufficiently. This may be because of the following reason. As the surface roughness of the tape is gradually increased from a flat state, the area of contact between an adherend surface and the tape surface decreases, and therefore the adhesion decreases. However, if the surface roughness is excessively large, the amount of the resin present on the rough surface 1a side increases more than the inorganic filler 2 as shown in FIG. 2. Therefore, the adhesion of the rough surface 1a increases, and the difference in adhesion strength from the other surface 1b decreases. The above fact that a large difference in adhesion can be provided between the front and rear sides of a tape by setting the surface roughness of the tape on the side on which the inorganic filler 2 is present within a specific range has been found by the present inventor.

An average particle diameter of the inorganic filler 2 exceeding 30 μm is not preferred because surface irregularities due to the inorganic filler 2 are formed also on the flat surface 1b of the tape and the difference in adhesion between the front and rear sides of the tape decreases. A preferred average particle diameter of the inorganic filler 2 is 5 to 20 μm, from the viewpoint of the difference in adhesion between the front and rear sides of the tape.

Preferably, the inorganic filler 2 has a specific gravity of 2.0 or larger so that the adhesive composition can be cured during production of the double-sided adhesive tape 1 after the inorganic filler 2 is allowed to rapidly sediment toward the one surface 1a of the tape and localized thereon. Examples of such an inorganic filler 2 include: insulating metal oxides such as aluminum oxide, magnesium oxide, and silicon dioxide; and metal hydroxides such as aluminum hydroxide.

Preferably, the inorganic filler 2 has a shape that allows irregularities to be easily formed on a surface of the tape by sedimentation. More specifically, a spherical inorganic filler, a perfect spherical inorganic filler, etc. can be preferably used.

A resin composition containing the following components (A) to (D):
(A) an acrylate-based monomer;
(B) a monomer copolymerizable with (A);
(C) a photopolymerization initiator; and
(D) a photo-crosslinking agent
is used as the resin composition for forming the adhesive layer 3.

Among them, the (A) acrylate-based monomer used may be any of alkyl acrylates and alkyl methacrylates (hereinafter these may be referred to as alkyl(meth)acrylates) having an alkyl group with 1 to 14 carbon atoms and preferably 4 to 12 carbon atoms. More specifically, such alkyl(meth)acrylates include butyl(meth)acrylate, isoamyl(meth)acrylate, 2-ethylhexyl(meth)acrylate, nonyl(meth)acrylate, isononyl(meth)acrylate, isooctyl(meth)acrylate, lauryl(meth)acrylate, decyl(meth)acrylate, etc., and at least one of them can be used.

Examples of the (B) monomer copolymerizable with (A) include (meth)acrylic acid, N-vinylpyrrolidone, itaconic acid, tetrahydrofurfuryl acrylate, ethyl(meth)acrylate, 2-hydroxyethyl(meth)acrylate, 2-hydroxypropyl(meth)acrylate, isobornyl(meth)acrylate, ethoxyethyl(meth)acrylate, butoxyethyl(meth)acrylate, phenoxyethyl(meth)acrylate, phenyl(meth)acrylate, and cyclohexyl(meth)acrylate, and at least one of them can be used.

An acetophenone-based or benzophenone-based initiator can be preferably used as the (C) photopolymerization initiator. Specific examples of such an initiator include 4-phenoxydichloroacetophenone, 4-t-butyl-dichloroacetophenone, diphenoxyacetophenone, 2-hydroxy-2-methyl-1-phenylpropane-1-one, 1-hydroxycyclohexylphenylketone, benzoin, benzoin methyl ether, benzoin isobutyl ether, benzyl methyl ketal, and mixtures thereof.

A polyfunctional (meth)acrylate can be used as the (D) photo-crosslinking agent.

The resin composition may contain, in addition to the above components, a rosin-, terpene-, or terpene phenol-based tackifier or a similar tackifier as a component (E) and may further contain a flame retardant etc., if necessary.

Preferably, the mixing ratio of the acrylate-based monomer being the component (A) and the monomer copolymerizable with (A) being the component (B) is 1 to 20 parts by mass of the component (B) to 100 parts by mass of the component (A).

Preferably, the resin composition is prepared so as to have a viscosity of 500 to 3,500 mPa·sec (B-type viscometer, rotor No. 3, 20 rpm, 25° C.). If the viscosity is too low, the resin composition is spread excessively during application, and therefore it is difficult to form a coating in which the inorganic filler is localized on one side. If the viscosity is too high, the sedimentation of the inorganic filler becomes slow, and therefore it is difficult to make a difference in the degree of sedimentation of the inorganic filler between the front and rear sides of the tape.

Preferably, the mixing ratio of the resin composition and the inorganic filler is 100 to 500 parts by mass of the inorganic filler to 100 parts by mass of the resin composition.

Figure 3:
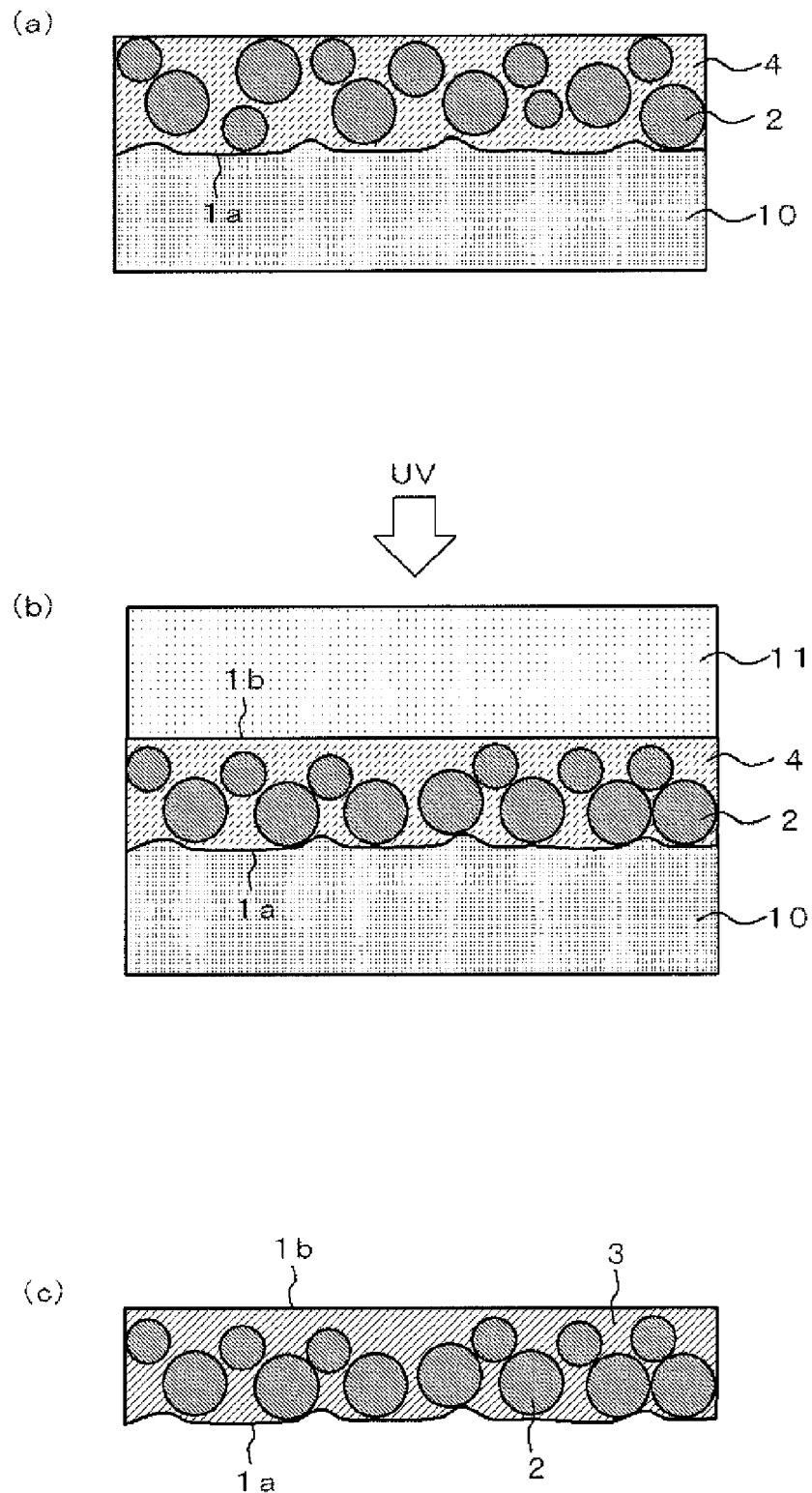
FIGS. 3(a) to (c) are diagrams illustrating a method of producing the double-sided adhesive tape of the present invention.

In a method of producing the double-sided adhesive tape 1, first, the respective components constituting the resin composition are mixed by a routine method to prepare the resin composition, and the resin composition 4 is applied uniformly to a release sheet 10 having a surface roughness (center line average roughness Ra) of 0.01 to 0.50 μm using a coater or the like, as shown in FIG. 3(a). Commercial release paper prepared by coating high-quality paper with polyethylene and then with silicone, a commercial release-treated plastic film, etc. can be used as the release sheet having the above surface roughness. The surface roughness of the release sheet 10 is a value measured according to JIS B0601. The thickness of the resin composition 4 applied to the release sheet 10 is preferably 50 to 500 μm.

Next, as shown in FIG. 3(b), to block the coating layer of the resin composition 4 from oxygen in the atmosphere, a release film 11 such as a transparent PET release film is laminated on the coating layer of the resin composition 4. Then UV rays are applied through the release film 11 to cure the resin composition 4, and the adhesive layer 3 is thereby formed. During curing, the inorganic filler 2 uniformly dispersed in the resin composition 4 sediments and is localized near the release sheet 10. Generally, the specific gravity of the inorganic filler 2 is at least 2 times larger than the specific gravity of the resin composition 4, so that the inorganic filler 2 sediments rapidly after application of the resin composition 4 to the release sheet 10. Therefore, it is practically unnecessary to provide settling time between the application and UV irradiation. However, to localize the inorganic filler 2 in a more reliable manner, it is preferable to provide a sedimentation time of at least 3 seconds after the application. After the resin composition 4 is cured by UV irradiation, the release sheet 10 and the release film 11 are removed, and the double-sided adhesive tape 1 of the present invention shown in FIG. 3(c) can thereby be obtained.

EXAMPLES

The present invention will next be specifically described by way of Examples.

Examples 1 to 3 and Comparative Examples 1 and 2

A resin composition having a composition shown in Table 1 was prepared, and 100 parts by mass of the resin composition and 100 parts by mass of aluminum hydroxide (average particle diameter; 20 μm, spherical) used as an inorganic filler were mixed to prepare an adhesive composition.

TABLE 1

| Components of resin composition | Amount added (parts by mass) |
|---|---|
| (A) Acrylate-based monomer: 2-ethylhexyl acrylate | 81 |
| (B) Monomer copolymerizable with (A): acrylic acid | 5.5 |
| (C) photopolymerization initiator: 1-hydroxy-cyclohexyl-phenyl-ketone | 0.86 |
| (D) photo-crosslinking agent: neopentylglycol hydroxypivalate diacrylate | 0.64 |
| (E) tackifier: terpene phenol copolymer (P-80, manufactured by Yasuhara Chemical Co., Ltd.) | 12 |

The viscosity (25° C.) of the resin composition was measured using a B-type viscometer (rotor No. 3, 20 rpm) and found to be 700 mPa·sec.

Five types of release sheets with different surface roughnesses shown in Table 2 were prepared. The surface roughness of each release sheet was measured using a surface roughness meter (SV-2100, manufactured by Mitutoyo Corporation) at a scan speed of 10 mm/s according to JIS B0601.

After the above-mentioned resin composition was well mixed, it was applied to one of the release sheets to a coating thickness of 100 μm using a coater, and a PET release film was laminated on the coating layer. UV rays were applied through the PET film (irradiation amount: 2.8 J/cm$^2$) to cure the resin composition. Double-sided adhesive tapes of Examples 1 to 3 and Comparative Examples 1 and 2 were thereby obtained.

Evaluation

For each of the double-sided adhesive tapes of Examples 1 to 3 and Comparative Examples 1 and 2, (a) the ball tack and (b) peel strength were measured on the front surface (flat surface) and the rear surface (rough surface) in accordance with the following manner. The results are shown in Table 2 and FIG. 4.

(a) Ball Tack

According to JIS Z 0237, hard balls were rolled on a tape inclined at an angle of 30°, and the maximum diameter of a hard ball that stopped on the tape was determined.

(b) Peel Strength

According to JIS Z 0237, measurement was performed using TENSILON RTA-250 (A&D Company, Limited) as a tensile tester and a SUS304 plate (polished plate) as a test piece at a tensile speed of 300 mm/min in a tensile direction of 180°.

TABLE 2

| | | Com. Ex. 1 | Ex. 1 | Ex. 2 | Ex. 3 | Com. Ex. 2 |
|---|---|---|---|---|---|---|
| Release sheet | Type | *1 | *2 | *3 | *4 | *5 |
| | Surface roughness [Ra] | 0.001 | 0.02 | 0.1 | 0.47 | 1.5 |
| Ball tack | Front surface Ball No. | 10 | 10 | 10 | 10 | 10 |
| | Rear surface Ball No. | 9 | 4 | 3 | 5 | 8 |
| Peel strength [N/2 cm] | Front surface | 13.8 | 13.9 | 13.7 | 13.6 | 13.8 |
| | Rear surface | 11.9 | 5.3 | 4.2 | 6.1 | 10.8 |
| | Front surface/ Rear surface | 1.2 | 2.6 | 3.3 | 2.2 | 1.3 |

(Note)
*1: PET film (PET50GS, manufactured by Lintec Corporation)
*2: Release paper (70GPS, manufactured by Oji Specialty Paper Co., Ltd.)
*3: Release paper (100EPW, manufactured by Oji Specialty Paper Co., Ltd.)
*4: Release paper (100GVh, manufactured by Oji Specialty Paper Co., Ltd.)
*5: Release paper (BK8 white PP, manufactured by Lintec Corporation)

Figure 4:
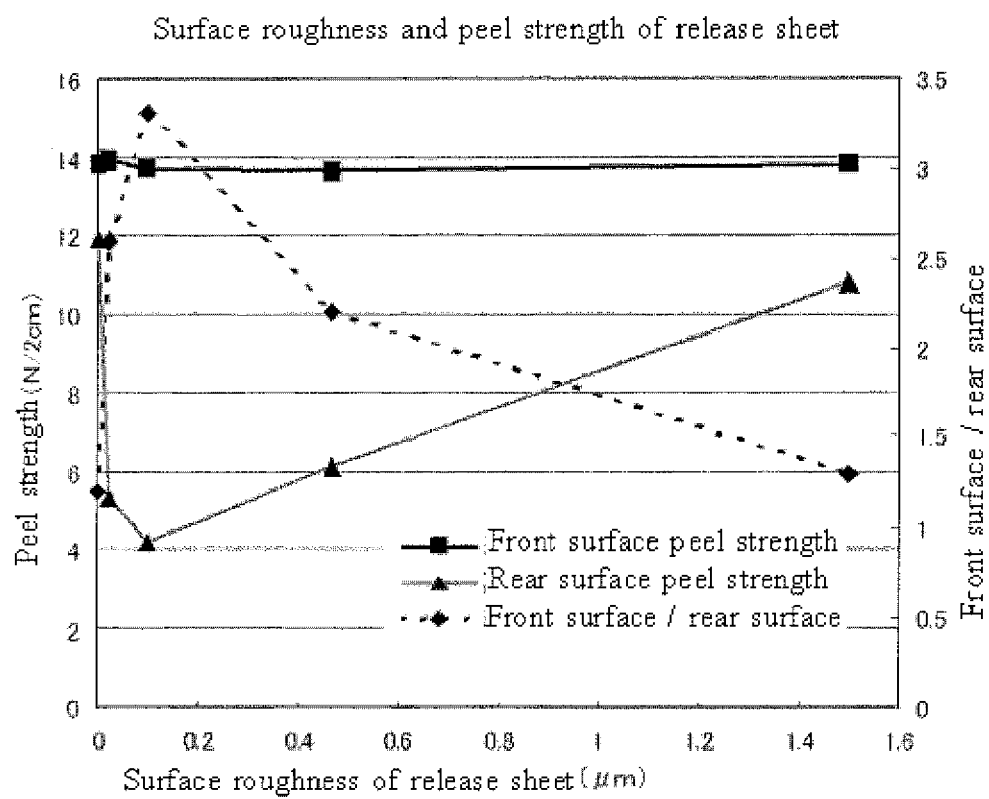
FIG. 4 is a graph showing the relation between surface roughness and peel strength in double-sided adhesive tapes in Examples and Comparative Examples.

As can be seen from the results shown in Table 2 and FIG. 4, in Examples 1 to 3 in which the surface roughness (Ra) of the release sheets, i.e., the surface roughness (Ra) of the rough surfaces of the double-sided adhesive tapes, fell within the range of 0.01 to 0.50 μm, the ratio of the peel strengths on the front and rear sides was 2 or larger. However, in Comparative Example 1 in which the surface roughness (Ra) fell below the above range and in Comparative Example 2 in which the surface roughness (Ra) fell above the above range, the difference in peel strength between the front and rear sides was small.

INDUSTRIAL APPLICABILITY

The double-sided adhesive tape of the present invention has a large difference in adhesion between the front and rear sides thereof and is therefore useful as a removable adhesive tape used, for example, to secure a component in an electronics device and useful for applications such as temporary affixation and removable affixation. Particularly, since the amount of the inorganic filler is large, the double-sided adhesive tape is useful as a removable adhesive tape required to have heat resistance.

REFERENCE SIGNS LIST 1 double-sided adhesive tape
1a one surface or rough surface of double-sided adhesive tape
1b the other surface or flat surface of double-sided adhesive tape
2 inorganic filler
3 adhesive layer
4 resin composition
10 release sheet
11 release film
M1, M2 adherend

The invention claimed is:

1. A double-sided adhesive tape comprising an adhesive composition containing an inorganic filler and a resin composition containing the following components (A) to (D)
   (A) an acrylate-based monomer,
   (B) a monomer copolymerizable with (A),
   (C) a photopolymerization initiator, and
   (D) a photo-crosslinking agent,
the adhesive composition being cured into a sheet form, wherein the inorganic filler has an average particle diameter of 30 μm or less and is localized on one side of the tape, and
   a surface roughness, with a center line average roughness Ra, of a tape surface on the one side on which the inorganic filler is localized is 0.01 to 0.50 μm; wherein no inorganic filler is present on a surface of the tape that is opposite to the tape surface on the one side on which the inorganic filler is localized.

2. The double-sided adhesive tape according to claim 1, wherein the adhesive composition includes the inorganic filler in an amount of 100 to 500 parts by mass relative to 100 parts by mass of the resin composition.

3. The double-sided adhesive tape according to claim 1, wherein a mixing ratio of the acrylate-based monomer being the component (A) and the monomer copolymerizable with (A) being the component (B) is 1 to 20 parts by mass of the component (B) to 100 parts by mass of the component (A).

4. The double-sided adhesive tape according to claim 1, wherein the resin composition has a viscosity of 500 to 3,500 mPa·sec (B-type viscometer, rotor No. 3, 20 rpm, 25° C.).

5. The double-sided adhesive tape according to claim 1, wherein a mixing ratio of the resin composition and the inorganic filler is 100 to 500 parts by mass of the inorganic filler to 100 parts by mass of the resin composition.

6. The double-sided adhesive tape according to claim 1, wherein the acrylate-based monomer being the component (A) is butyl (meth)acrylate, isoamyl (meth)acrylate, 2-ethylhexyl (meth)acrylate, nonyl (meth)acrylate, isononyl (meth)acrylate, isooctyl (meth)acrylate, lauryl (meth)acrylate, or decyl (meth)acrylate.

7. The double-sided adhesive tape according to claim 1, wherein the monomer copolymerizable with (A) being the component (B) is (meth)acrylic acid, N-vinylpyrrolidone, itaconic acid, tetrahydrofurfuryl acrylate, ethyl (meth)acrylate, 2-hydroxyethyl (meth)acrylate, 2-hydroxypropyl (meth)acrylate, isobornyl (meth)acrylate, ethoxyethyl (meth)acrylate, butoxyethyl (meth)acrylate, phenoxyethyl (meth)acrylate, phenyl (meth)acrylate, or cyclohexyl (meth)acrylate.

8. The double-sided adhesive tape according to claim 1, wherein the photopolymerization initiator being the component (C) is 4-phenoxydichloroacetophenone, 4-t-butyl-dichloroacetophenone, diphenoxyacetophenone, 2-hydroxy-2-methyl-1-phenylpropane-1-one, 1-hydroxycyclohexylphenylketone, benzoin, benzoin methyl ether, benzoin isobutyl ether, or benzyl methyl ketal.

9. The double-sided adhesive tape according to claim 1, wherein the photo-crosslinking agent being the component (D) is a polyfunctional (meth)acrylate.

10. The double-sided adhesive tape according to claim 1, further comprising the following component (E),
    (E) a tackifier.

11. The double-sided adhesive tape according to claim 10, wherein the tackifier being the component (E) is a rosin-based tackifier, a terpene-based tackifier, or a terpene phenol-based tackifier.

12. The double-sided adhesive tape according to claim 1, wherein the surface of the tape that is opposite to the tape surface on the one side on which the inorganic filler is localized is flat.

* * * * *